United States Patent
Muto et al.

(10) Patent No.: US 7,123,000 B2
(45) Date of Patent: Oct. 17, 2006

(54) ADJACENT CHANNEL LEAKAGE POWER RATIO MEASURING APPARATUS, CHANNEL POWER MEASURING APPARATUS METHOD, PROGRAM, AND RECORDING MEDIUM WITH RECORDING THE PROGRAM

(75) Inventors: Masahiko Muto, Tokyo (JP); Akio Morikawa, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 10/467,720

(22) PCT Filed: Jan. 21, 2002

(86) PCT No.: PCT/JP02/00379

§ 371 (c)(1),
(2), (4) Date: Aug. 12, 2003

(87) PCT Pub. No.: WO02/065672

PCT Pub. Date: Aug. 22, 2002

(65) Prior Publication Data
US 2004/0070386 A1 Apr. 15, 2004

(30) Foreign Application Priority Data
Feb. 13, 2001 (JP) ............................. 2001-035607
Mar. 23, 2001 (JP) ............................. 2001-084980

(51) Int. Cl.
*G01R 23/165* (2006.01)
*G01R 23/16* (2006.01)
*H04B 17/00* (2006.01)

(52) U.S. Cl. .............................. 324/76.29; 324/76.21; 455/67.11

(58) Field of Classification Search ............. 324/76.29, 324/76.19, 76.27, 76.11, 76.21; 455/67.11, 455/67.13, 302–306, 226.1, 226.3, 295–296; 375/224
See application file for complete search history.

(56) References Cited

U.S. PATENT DOCUMENTS

| | | | | |
|---|---|---|---|---|
| 4,810,960 A | * | 3/1989 | Owen et al. ............. | 324/76.44 |
| 5,475,709 A | * | 12/1995 | Futagami et al. ........... | 375/224 |
| 5,808,463 A | * | 9/1998 | Nagano ................... | 324/76.21 |
| 5,818,215 A | * | 10/1998 | Miyamae et al. ........ | 324/76.27 |
| 5,907,797 A | * | 5/1999 | Hanatatsu et al. ....... | 455/115.2 |
| 6,046,987 A | * | 4/2000 | Tagawa ..................... | 370/252 |
| 6,101,218 A | * | 8/2000 | Nagano ..................... | 375/224 |
| 6,344,735 B1 | * | 2/2002 | Yoshino et al. .......... | 324/76.39 |

FOREIGN PATENT DOCUMENTS

| | | |
|---|---|---|
| JP | 8-292218 A | 11/1996 |
| JP | 9-138251 A | 5/1997 |

(Continued)

*Primary Examiner*—Anjan Deb
*Assistant Examiner*—Jeff Natalini
(74) *Attorney, Agent, or Firm*—Lowe Hauptman & Berner LLP.

(57) ABSTRACT

The frequency of an adjacent channel signal is reduced by a down converter (12), wherein the signal (adjacent channel signal) in a predetermined band centered around the adjacent channel frequency passes through a band-pass filter (22). At this time, a signal out of the predetermined band among the signals output from the down converter (12) by the band-pass filter (22) passes through the filter (22). An FFT section (32) outputs the signal having passed through the band-pass filter (22) by making it correspond with a frequency so that a first power measuring section (34) is used for power measurement on the basis of only the signal in a predetermined band. Therefore, power on an adjacent signal is accurately measured upon reception of a measurement signal.

15 Claims, 8 Drawing Sheets

FOREIGN PATENT DOCUMENTS

| | | | |
|---|---|---|---|
| JP | 9-266464 A | 10/1997 | |
| JP | 9-275379 A | 10/1997 | |
| TW | 328563 A | 3/1998 | |

* cited by examiner

ADJACENT CHANNEL LEAKAGE POWER RATIO MEASURING APPARATUS, CHANNEL POWER MEASURING APPARATUS METHOD, PROGRAM, AND RECORDING MEDIUM WITH RECORDING THE PROGRAM

TECHNICAL FIELD

The present invention relates to measuring channel power.

BACKGROUND ART

Conventionally, ACLR (Adjacent Channel Leakage Power Ratio) has been measured in W-CDMA system and the like. The adjacent channel leakage power ratio implies a ratio between the power of a center channel and the power of a predetermined adjacent channel. Usually, the adjacent channel leakage power ratio is defined as a ratio between powers within predetermined bands. To obtain a power within the predetermined band, usually, a filter is used to limit the bands, and the power is obtained based on a signal after limiting the bands.

Figure 8:
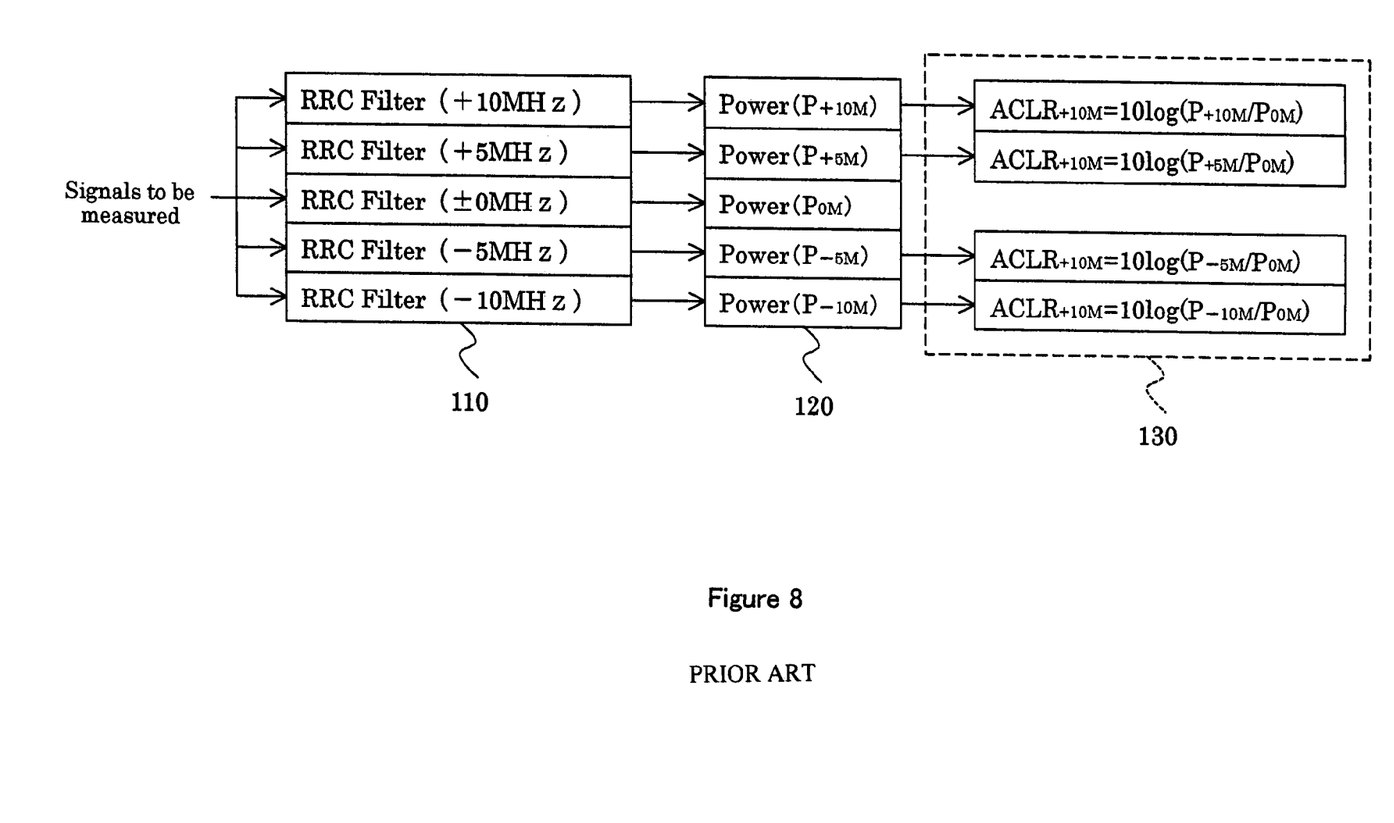
FIG. 8 shows how to measure the adjacent channel leakage power ratio according to prior art.

The following section describes how to measure the adjacent channel leakage power ratio in the W-CDMA system. In the W-CDMA system, the adjacent channel leakage power ratio is determined as ten times of a common logarithm (log) of a ratio between the power within a band centered around the center channel frequency and the power within a band separated from the center channel frequency by ±5 MHz or ±10 MHz. As the filter for limiting the bands, an RRC filter (Root Raised Cosine Filter: 3.84 MHz, roll off factor: 0.22) is used. The RRC filter is a filter provides root raised cosine response. FIG. 8 shows how to measure the adjacent channel leakage power ratio according to prior art.

A signal to be measured on which the adjacent channel leakage power ratio is measured is passed through RRC filters 110 which pass signals in predetermined bands centered around a center channel frequency, the center channel frequency ±5 MHz, and the center channel frequency ±10 MHz. Then, the power measuring unit 120 obtains powers $P_{0M}$, $P_{+5M}$, $P_{-5M}$, $P_{+10M}$, and $P_{-10M}$ in the respective bands based on signals which have passed through the RRC filters. Then, finally, adjacent channel leakage power ratio measuring unit 130 obtains common logarithms (logs) of ratios between the powers of the individual adjacent channels $P_{+5M}$, $P_{-5M}$, $P_{+10M}$, and $P_{-10M}$ and the power of the center channel $P_{0M}$, and multiplies the logarithms by 10, thereby obtaining the adjacent channel leakage power ratios. Note that when the RRC filter passes a signal in the predetermined band centered around the center channel frequency, the RRC filter sufficiently attenuates a signal outside the predetermined band.

Note that measurement may be conducted while the center frequency of the signal to be measured is moved by ±5 MHz and ±10 MHz to meet the widened band of the signal band. In this case, the band to be measured is lowered (down-converted) to a baseband signal.

However, when the RRC filter is used to pass a signal only in a predetermined band centered around a frequency displaced from the center channel frequency by a certain offset (such as 5 and 10 MHz), the RRC filter does not sufficiently attenuate the signals other than the signal in the predetermined band. Thus, when the powers of the individual adjacent channels $P_{+5M}$, $P_{-5M}$, $P_{+10M}$, and $P_{-10M}$ are obtained, the power outside the bands of the adjacent channels are added to the powers of the adjacent channels, the powers of the adjacent channels are not obtained correctly. In this way, there exists such a problem that the power of the channel is not obtained correctly due to the inferior characteristic of the band-pass filter such as the RRC filter.

Thus, the object of the present invention is to provide a channel power measuring apparatus and the like which can precisely measure the power of a channel such as an adjacent channel.

DISCLOSURE OF THE INVENTION

The present invention, is a channel power measuring apparatus for receiving a signal to be measured, and measuring a channel power being a power of the signal to be measured within a predetermined band, the apparatus including: a band-pass filter unit for passing a signal which is a part of the signal to be measured within the predetermined band; a frequency-axis-associated signal converting unit for converting the signal to be measured after passing through the band-pass filter unit to a frequency-axis-associated signal associated with frequency; and a first power measuring unit for measuring the power of the signal to be measured within the predetermined band based on a signal within the predetermined band of the frequency-axis-associated signal.

With the channel power measuring apparatus constituted as described above, it is possible to use only the signal within the predetermined band for the power measurement based on the frequency-axis-associated signal even when the band-pass filter unit has an inferior characteristic, and passes a certain quantity of a signal outside the predetermined band. Thus, it is possible to receive the signal to be measured, and then, to precisely measure the power within the predetermined band.

According to the present invention, the channel power measuring apparatus includes a frequency converting unit for converting the frequency of the signal to be measured so as to supply the band-pass filter unit with the converted signal.

According to the present invention, the channel power measuring apparatus further includes a frequency converting unit for converting the frequency of the signal to be measured after passing through the band-pass filter unit so as to supply the frequency-axis-associated signal converting unit with the converted signal.

The present invention, is the channel power measuring apparatus in that the signal to be measured includes a center channel signal within a band determined based on a center channel frequency, and an adjacent channel signal within a band determined based on an adjacent channel frequency separated from the center channel frequency by a predetermined frequency; and the predetermined band is a band centered around the adjacent channel frequency.

The present invention is the channel power measuring apparatus in that the center channel signal and the adjacent channel signal are input independently.

The present invention is the channel power measuring apparatus in that the band-pass filter unit passes the adjacent channel signal and the center channel signal, and further including: a second power measuring unit for measuring the power of the center channel signal based on the signal which is a part of the center channel signal, and passes through the band-pass filter unit.

According to the present invention, an adjacent channel leakage power ratio measuring apparatus includes the channel power measuring apparatus and an adjacent channel leakage power ratio measuring unit for measuring the adjacent channel leakage power ratio based on the ratio between the measured result of the first power measuring unit and the measured result of the second power measuring unit.

The band-pass filter unit may present a degraded characteristic in terms of passing the adjacent channel signal when it is constituted to pass the center channel signal. In this case, as for the adjacent channel signal, it is possible to precisely measure the power within the adjacent channel by measuring the power within the adjacent channel based on the frequency-axis-associated signal.

Then, as for the center channel signal, the power within the center channel is precisely measured by using the signal after passing through the band-pass filter unit to measure the power.

Thus, since the power within the adjacent channel and the power within the center channel are precisely measured, the adjacent channel leakage power ratio is precisely measured.

The present invention is a channel power measuring method for receiving a signal to be measured, and measuring a channel power being a power of the signal to be measured within a predetermined band, the method including: a band-pass filter step for passing a signal which is a part of the signal to be measured within the predetermined band; a frequency-axis-associated signal converting step for converting the signal to be measured after performing the band-pass filter step to a frequency-axis-associated signal associated with frequency; and a first power measuring step for measuring the power of the signal to be measured within the predetermined band based on a signal within the predetermined band of the frequency-axis-associated signal.

The present invention is a program of instructions for execution by the computer to perform a channel power measuring process for receiving a signal to be measured, and measuring a channel power being a power of the signal to be measured within a predetermined band, the process including a band-pass filter processing for passing a signal which is a part of the signal to be measured within the predetermined band; a frequency-axis-associated signal converting processing for converting the signal to be measured after performing the band-pass filter processing to a frequency-axis-associated signal associated with frequency; and a first power measuring processing for measuring the power of the signal to be measured within the predetermined band based on a signal within the predetermined band of the frequency-axis-associated signal.

The present invention is a program of instructions for execution by the computer to perform a channel power measuring process for a channel power measuring apparatus for receiving a signal to be measured, and measuring a channel power being a power of the signal to be measured within a predetermined band, the apparatus including a band-pass filter unit for passing a signal which is a part of the signal to be measured within the predetermined band, the process including: a frequency-axis-associated signal converting processing for converting the signal to be measured after performing the band-pass filter processing to a frequency-axis-associated signal associated with frequency; and a first power measuring processing for measuring the power of the signal to be measured within the predetermined band based on a signal within the predetermined band of the frequency-axis-associated signal.

The present invention is a computer-readable medium having a program of instructions for execution by the computer to perform a channel power measuring process for receiving a signal to be measured, and measuring a channel power being a power of the signal to be measured within a predetermined band, the process including: a band-pass filter processing for passing a signal which is a part of the signal to be measured within the predetermined band; a frequency-axis-associated signal converting processing for converting the signal to be measured after performing the band-pass filter processing to a frequency-axis-associated signal associated with frequency; and a first power measuring processing for measuring the power of the signal to be measured within the predetermined band based on a signal within the predetermined band of the frequency-axis-associated signal.

The present invention is a computer-readable medium having a program of instructions for execution by the computer to perform a channel power measuring process for a channel power measuring apparatus for receiving a signal to be measured, and measuring a channel power being a power of the signal to be measured within a predetermined band, the apparatus including a band-pass filter unit for passing a signal which is a part of the signal to be measured within the predetermined band, the process including: a frequency-axis-associated signal converting processing for converting the signal to be measured after performing the band-pass filter processing to a frequency-axis-associated signal associated with frequency; and a first power measuring processing for measuring the power of the signal to be measured within the predetermined band based on a signal within the predetermined band of the frequency-axis-associated signal.

BEST MODE FOR CARRYING OUT THE INVENTION

The following section describes embodiments of the present invention while referring to drawings.

FIRST EMBODIMENT

Figure 1:
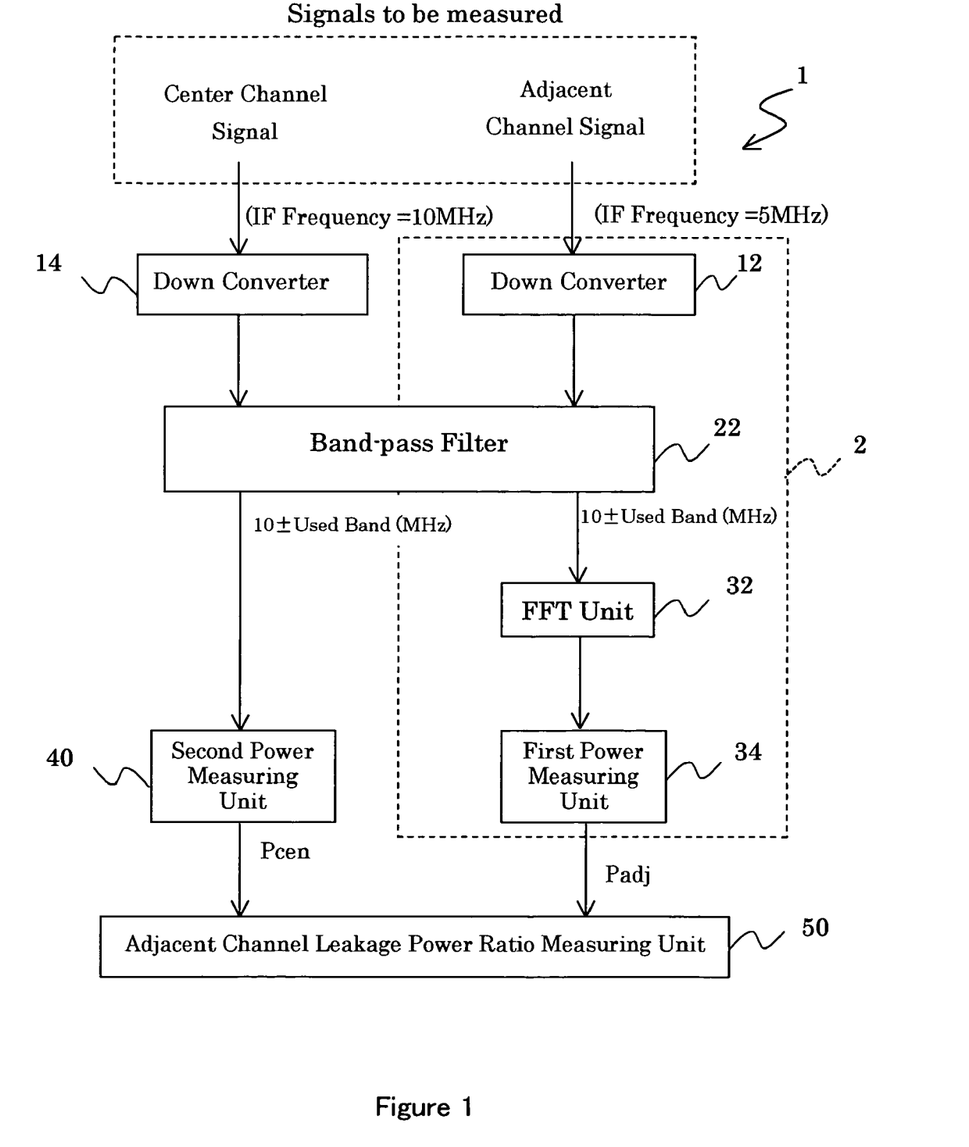
FIG. 1 is a block diagram showing the constitution of an adjacent channel leakage power ratio measuring apparatus 1 according to a first embodiment of the present invention.

FIG. 1 is a block diagram showing the constitution of an adjacent channel leakage power ratio measuring apparatus 1 according to a first embodiment of the present invention. The adjacent channel leakage power ratio measuring apparatus 1 according to the first embodiment of the present invention includes down-converters (frequency converting means) 12 and 14, a band-pass filter 22, an FFT (Fast Fourier Transfer) unit (frequency-axis-associated signal converting means) 32, a first power measuring unit 34, a second power measuring unit 40, and an adjacent channel leakage power ratio measuring unit 50. Note that the down-converter (frequency converting means) 12, the band-pass filter 22, the FFT (Fast Fourier Transfer) unit (frequency-axis-associated signal converting means) 32, and the first power measuring unit 34 constitute a channel power measuring apparatus 2 which is a characteristic part of the present invention. The channel power measuring apparatus 2 measures the power of the adjacent channel.

The adjacent channel leakage power ratio measuring apparatus 1 is an apparatus which receives signals to be measured, and then, measures the adjacent channel leakage power ratio. As the signals to be measured, signals according to W-CDMA (Wide band Code Division Multiple Access) system are assumed. The signals to be measured include two types, which are a center channel signal and an adjacent channel signal, and are respectively supplied for the adjacent channel leakage power ratio measuring apparatus 1. The center channel signal is a signal within a band centered around a center channel frequency. The adjacent channel signal is a signal within a band centered around an adjacent channel frequency separated from the center channel frequency by a certain frequency. In the first embodiment, it is assumed that the adjacent channel frequency=center channel frequency−5 [MHz]. The band width of the center channel signal and the adjacent channel signal is determined by the characteristic of the band-pass filter 22, and is detailed later.

Though FIG. 1 shows only one adjacent channel signal, multiple adjacent channel signals may exist. For example, the adjacent channel frequency=the center channel frequecy+5 [MHz] or the adjacent channel frequencies=the center channel frequency±10 [MHz], and may be additionally supplied for the adjacent channel leakage power ratio measuring apparatus 1.

The down converters (frequency converting means) 12 and 14 convert the signals to be measured so as to reduce their frequencies, thereby forming baseband signals. The down converter 12 reduces the frequency of the adjacent channel signal, and the down converter 14 reduces the frequency of the center channel signal. It is assumed that the IF frequency of the down converter 12 is 5 MHz, and the IF frequency of the down converter 14 is 10 MHz. The frequencies are reduced as expressed by equations (1) and (2) where the adjacent channel signal is Sadj and the center channel signal is Scen. Note that the equation (1) indicates the frequency reduction by the down converter 12, and the equation (2) indicates the frequency reduction by the down converter 14.

$$Sadj \cdot \cos(2\pi(10 \text{ MHz}) t) - j \cdot Sadj \cdot \sin(2\pi(10 \text{ MHz})t) \quad (1)$$

$$Scen \cdot \cos(2\pi(10 \text{ MHz}) t) - j \cdot Scen \cdot \sin(2\pi(10 \text{ MHz})t) \quad (2)$$

The band-pass filter 22 passes the signals to be measured after passing through the down converters 12 and 14. The band-pass filter 22 is an RRC (Root Raised Cosine) filer which provides root raised cosine response, for example. The band-pass filter 22 is set so as to pass the signals within the bands of the baseband signals of the down-converters 12 and 14. When the band-pass filter 22 is an RRC filter (3.84 MHz, roll off factor: 0.22), the predetermined band extends from [10 MHz−used band W] to [10 MHz+used band W]. Note that, used band W=(1+0.22)×3.84/2=2.3424 [MHz]. Therefore, the band-pass filter 22 passes a part from 10−2.3424 [MHz] to 10+2.3424 [MHz] of the signal having passed through the down-converter 12. Also, the band-pass filter 22 passes a signal which is a part from 10−2.3424 [MHz] to 10+2.3424 [MHz] of the signal having passed through the down-converter 14.

The band-pass filter 22 is set so as to have an excellent characteristic only for passing a signal within the band centered around 10 [MHz]. Thus, the characteristic of passing a signal within the band centered around 5 [MHz] degrades. Namely, it also passes a part outside the predetermined band centered around 5 [MHz] of the signal output from the down converter 12.

The FFT (Fast Fourier Transfer) unit (frequency-axis-associated signal converting means) 32 applies FFT (Fast Fourier Transfer) to the signal which is the part of the adjacent channel signal output from the down converter 12, and passes through the band-pass filter 22. As a result, the signal input to the FFT unit 32 is output as a signal associated with the frequency. The signal output from the FFT unit 32 is referred to as a frequency-axis-associated signal. The frequency-axis-associated signal implies a signal associated with the frequency while the frequency is assigned to an axis. A unit which outputs the frequency-axis-associated signal may be used in place of the FFT unit 32.

A fixed point operation unit may be used as the FFT unit 32. The power corresponding to the center channel is attenuated since the signal input to the FFT unit 32 is the signal which is output from the down converter 12, and then passes through the band-pass filter 22. Thus, the power of the signal input to the FFT unit 32 is close to the power of the adjacent channel. Therefore, it is possible to reduce the calculation error by shifting the input level of the FFT unit 32 to an optimal level for the fixed point operation unit.

The first power measuring unit 34 measures the power Padj of the signal to be measured within the predetermined band (adjacent channel signal) based on the part within the band centered around the adjacent channel frequency (from 10−2.3424 [MHz] to 10+2.3424 [MHz]) of the frequency-axis-associated signal. Equation (3) shows how to measure the power Padj.

[Equation 3]

$$P_{adj} = \sum_{k=1}^{N} \left( FFT_{Re_k^2} + FFT_{Im_k^2} \right) / N \quad (3)$$

Note that $FFT_{Re}$ is the real part of the frequency-axis-associated signal, $FFT_{Im}$ is an imaginary part of the frequency-axis-associated signal, and N is the number of data within the band centered around the adjacent channel frequency.

The second power measuring unit 40 measures the power Pcen of the center channel signal based on the signal which is a part of the center channel signal output from the down converter 14, and passes through the band-pass filter 22. Equation (4) shows how to measure the power Pcen.

[Equation 4]

$$P_{cen} = \sum_{k=1}^{N} \left( BB_{Re_k}^2 + BB_{Im_k}^2 \right) / N \quad (4)$$

Note that $BB_{Re}$ is a real part of the signal which is a part of the center channel signal output from the down-converter 14 and passes through the band-pass filter 22, $BB_{Im}$ is an imaginary part of the signal which is a part of the center channel signal output from the down-converter 14 and passes through the band-pass filter 22, and N is the number of data within the band centered around the center channel frequency.

The adjacent channel leakage power ratio measuring unit 50 measures the adjacent channel leakage power ratio based on the measured result Padj from the first power measuring unit 34 and the measured result Pcen from the second power measuring unit 40. Note that the adjacent channel leakage power ratio=10 log(Padj/Pcen).

Note that with the down-converter 12, the band-pass filter 22, the FFT unit 32, and the first power measuring unit 34, the adjacent channel power is precisely measured though the characteristic of the band-pass filter 22 is inferior in the adjacent channel (from 5−2.3424 [MHz] to 5+2.3424 [MHz]). Namely, the down-converter 12, the band-pass filter 22, the FFT unit 32, and the first power measuring unit 34 constitute the channel power measuring apparatus 2 which overcomes the inferior characteristic of the band-pass filter 22.

The following section describes the operation of the first embodiment of the present invention.

Figure 2:
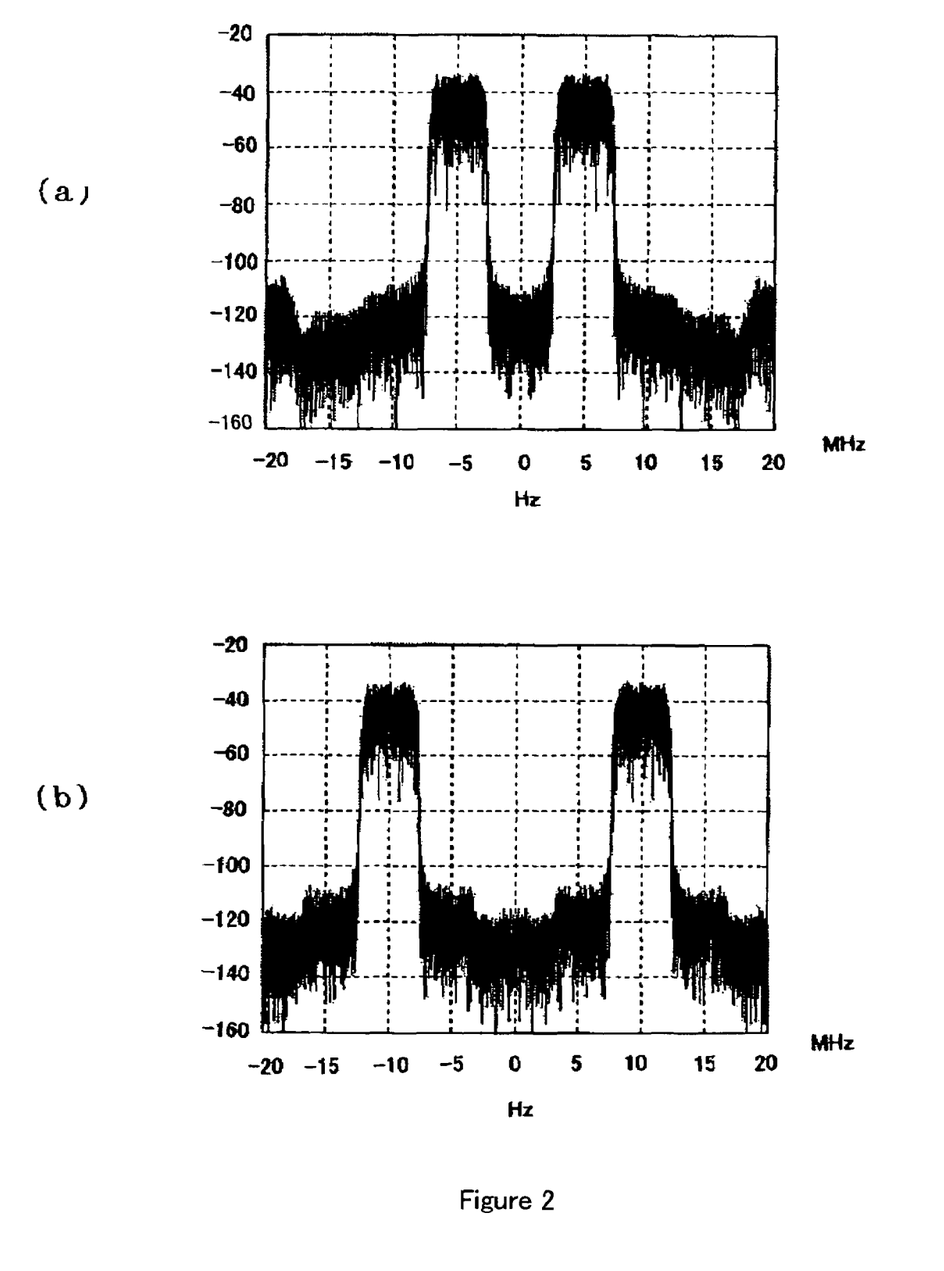
FIG. 2 includes drawings showing spectra of signals to be measured, and a spectrum of an adjacent channel signal (FIG. 2(a)) and a spectrum of a center channel signal (FIG. 2(b)) are shown.

Referring to FIG. 1, the adjacent channel signal and the center channel signal of the signals to be measured are independently supplied for the adjacent channel leakage power ratio measuring apparatus 1. In more detail, the adjacent channel signal is supplied for the down-converter 12, and the center channel signal is supplied for the down-converter 14. Note that the IF frequency is 5 MHz in the down-converter 12, and the IF frequency is 10 MHz in the down-converter 14. FIG. 2(a) shows the spectrum of the adjacent channel signal, and FIG. 2(b) shows the spectrum of the center channel signal.

The frequency of the adjacent channel signal is reduced to a baseband signal by the down-converter 12, and the frequency of the center channel signal is reduced to a baseband signal by the down-converter 14. The baseband signals are provided for the band-pass filter 22, and the signals within the predetermined band pass through the band-pass filter 22. In more detail, of the baseband signal, the signal which is the part from 10−2.3424 [MHz] to 10+2.3424 [MHz] of the adjacent channel signal output from the down-converter 12 passes through the band-pass filter 22. Of the baseband signal, the signal which is the part from 10−2.3424 [MHz] to 10+2.3424 [MHz] of the center channel signal output from the down-converter 14 passes through the band-pass filter 22.

Figure 3:
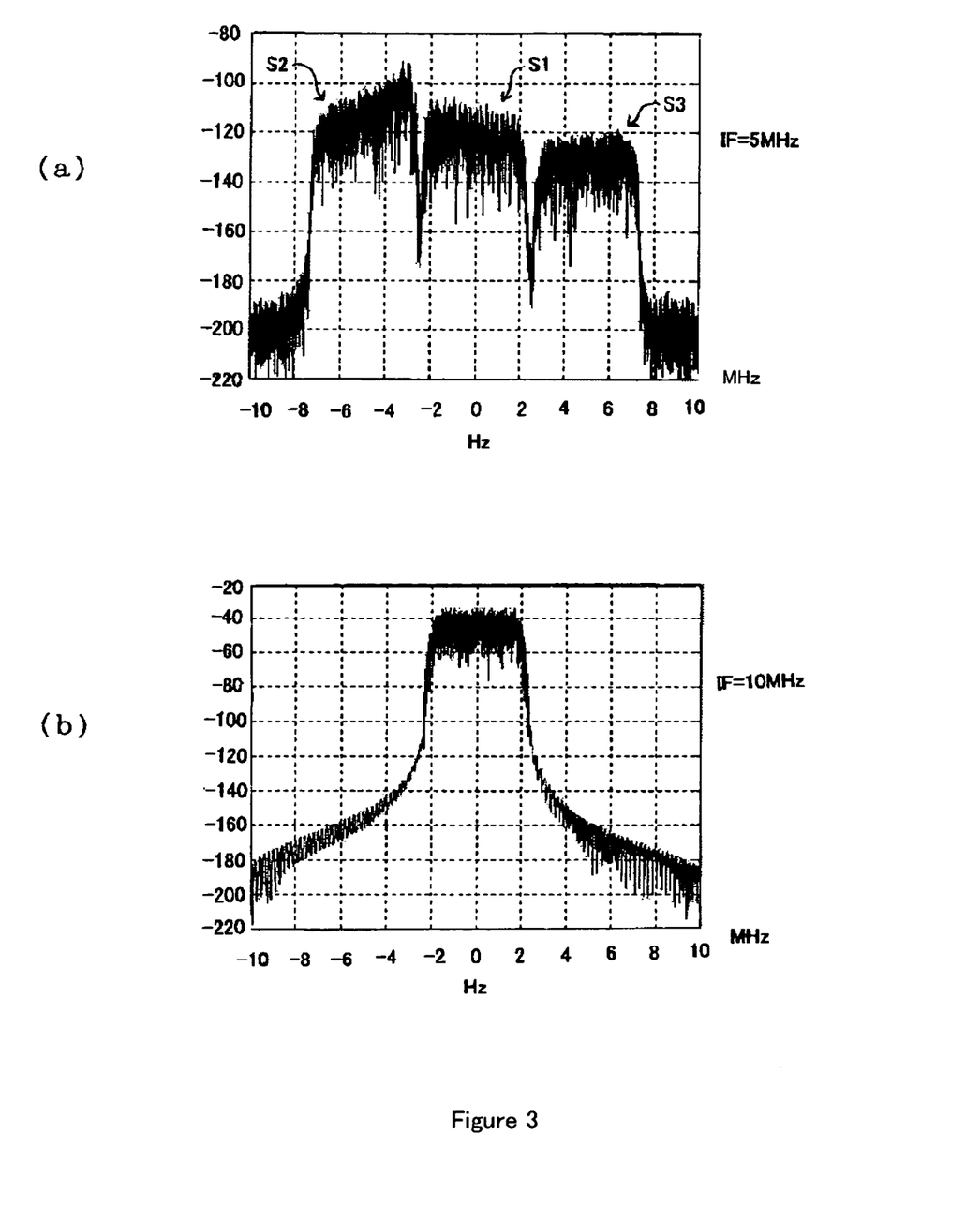
FIG. 3 includes drawings showing spectra of signals after passing through a band-pass filter 22, and a spectrum of the adjacent channel signal after passing through the band-pass filter 22 (FIG. 3(a)) and a spectrum of the center channel signal after passing through the band-pass filter 22 (FIG. 3(b)) are shown.

FIG. 3(a) shows the spectrum of a signal which is the adjacent channel signal output from the down-converter 12, and passes through the band-pass filter 22, and FIG. 3(b) shows the spectrum of a signal which is the center channel signal output from the down-converter 14, and passes through the band-pass filter 22. Referring to FIG. 3(a), it can be observed that leakage components S2 and S3, which the band-pass filter 22 passes though it should not, exist in addition to the actual adjacent channel signal S1. As a result, it can be understood that the adjacent channel signal has a large error. Referring to FIG. 3(b), the signal is large around 0 MHz, and decreases from a neighborhood of a point separated by approximately 2.3 MHz (used band W). As a result, it can be observed that the center channel signal has a small error.

Of course, the band-pass filter 22 simply limits the band, and does not have a feature of representing a signal as a spectrum. Therefore, even when the signal after passing through the band-pass filter 22 is simply observed, it is not possible to recognize how much error the adjacent channel signal contains. Thus, when the signal after passing through the band-pass filter 22 is simply used to measure the power of the adjacent channel signal, the error is large and cannot be removed.

Figure 4:
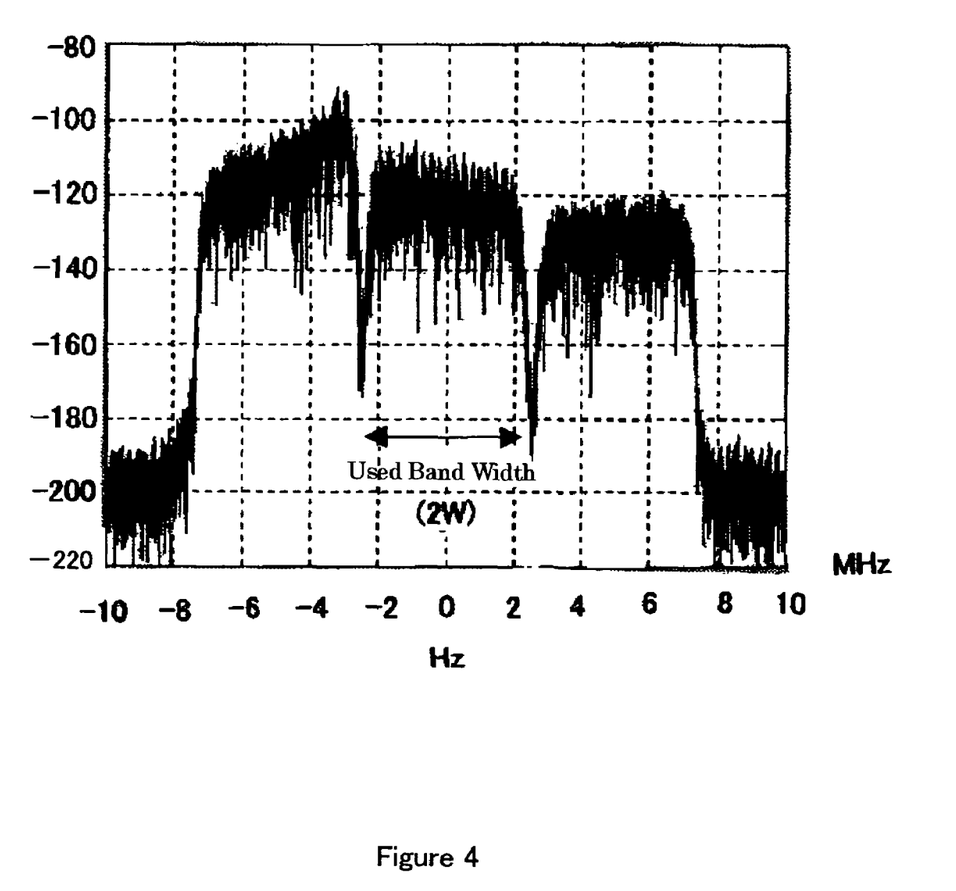
FIG. 4 shows a result when an FFT unit 32 applies FFT to the adjacent channel signal.

The signal which is the adjacent channel signal output from the down converter 12, and passes through the band-pass filter 22 is input to the FFT unit 32. The FFT unit 32 applies FFT on the input signal. FIG. 4 shows a result when the FFT unit 32 applies FFT to the adjacent channel signal. FIG. 4 is similar to FIG. 3(a). However, FIG. 4 shows the used band width (2W). The signal inside the used band width is the actual adjacent channel signal. According to the output result from the FFT unit 32, it is possible to recognize which part of the signal after passing through the band-pass filter 22 is the actual adjacent channel signal.

Based on the output from the FFT unit 32, the first power measuring unit 34 measures the power Padj of the adjacent channel signal. Since it is possible to recognize which part of the signal after passing through the band-pass filter 22 is the actual adjacent channel signal according to the output result from the FFT unit 32, the first power measuring unit 34 precisely measures the Padj.

On the other hand, the signal which is the center channel signal output from the down converter 14, and passes through the band-pass filter 22 is input to the second power measuring unit 40. The signal which is the center channel signal after passing through the band-pass filter 22 has a small error as shown in FIG. 3(b). Thus, the signal which is the center channel signal after passing through the band-pass filter 22 can be directly used for measuring the power of the center channel signal without converting it into a signal associated with the frequency axis. The second power measuring unit 40 measures the power Pcen of the center channel signal based on the signal which is the center channel signal after passing through the band-pass filter 22.

The power Padj of the adjacent channel signal measured by the first power measuring unit 34, and the power Pcen of the center channel signal measured by the second power measuring unit 40 are supplied for the adjacent channel leakage power ratio measuring unit 50. The adjacent channel leakage power ratio measuring unit 50 measures the adjacent channel leakage power ratio.

With the first embodiment, even when the band-pass filter 22 has an degraded characteristic, and passes a certain quantity of a signal outside the band of the adjacent channel signal, only the signal within the band of the adjacent channel signal is used for measuring the power of the adjacent channel signal based on the frequency-axis-associated signal output from the FFT unit 32. Thus, it is possible to receive the signal to be measured, and then to precisely measure the power within the predetermined band (band of the adjacent channel signal).

Note that to precisely measure the power within the predetermined band (band of the adjacent channel signal), though it is conceivable to improve the characteristic of the band-pass filter 22, the number of taps increases and the time required for calculation increases in case of a software filter. Also, a high-order filter is required, and the size of the circuit increases in case of a hardware filter.

However, with the first embodiment, since it is possible to precisely measure the power within the predetermined band (band of the adjacent channel signal) without improving the characteristic of the band-pass filter 22, it does not cause the increase of the calculation time, or the increase of the circuit size.

Also, the band-pass filter 22 may present a degraded characteristic for passing the adjacent channel signal when it is constituted to pass the center channel signal. In this case, as for the adjacent channel signal, it is possible to precisely measure the power Padj within the adjacent channel by using the first power measuring unit 34 to measure the power within the adjacent channel based on the frequency-axis-associated signal.

Then, as for the center channel signal, the power Pcen within the center channel is precisely measured by using the second power measuring unit 40 to measure the power based on the signal having passed through the band-pass filter 22.

Thus, since the power Padj within the adjacent channel and the power Pcen within the center channel are precisely measured, the adjacent channel leakage power ratio is precisely measured.

SECOND EMBODIMENT

Figure 5:
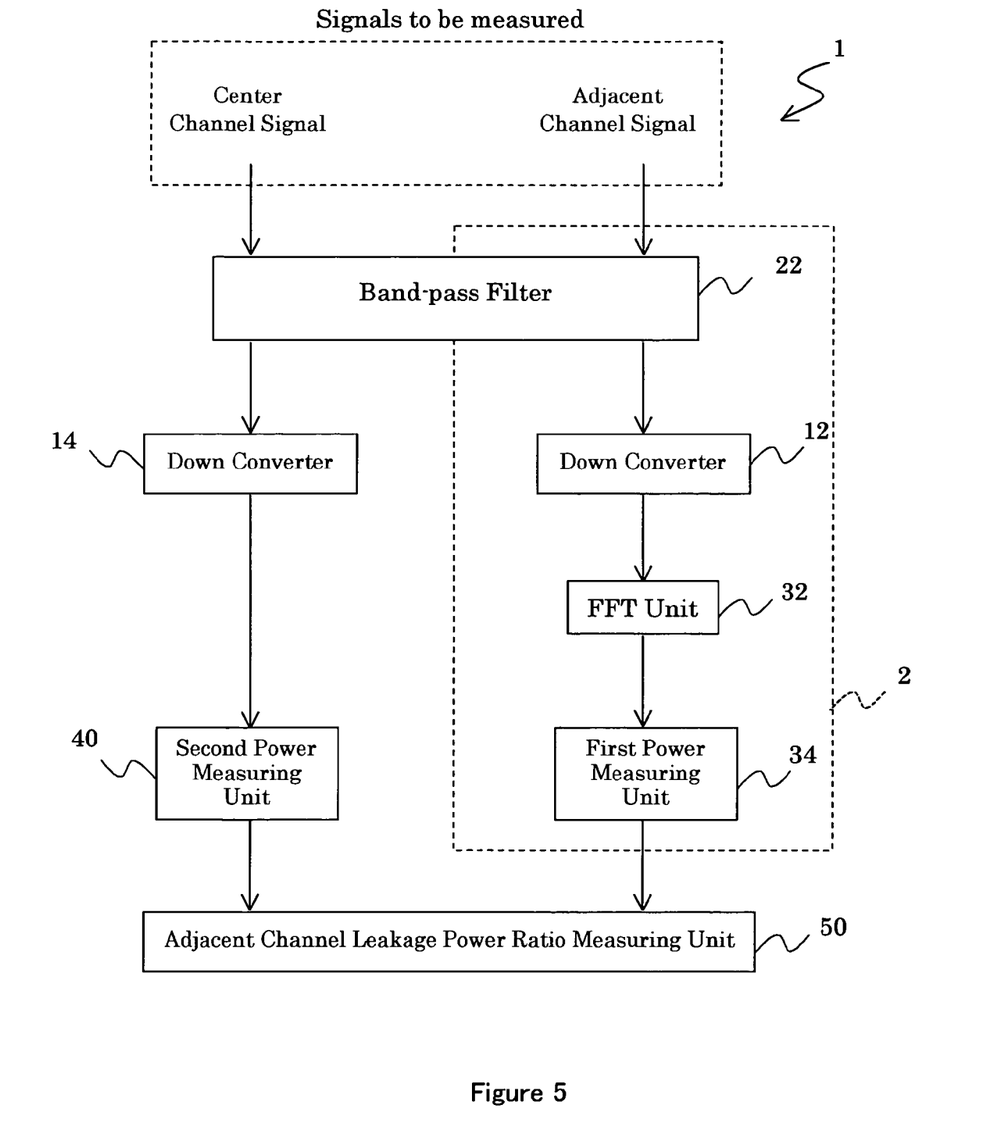
FIG. 5 is a block diagram showing the constitution of the adjacent channel leakage power ratio measuring apparatus 1 according to a second embodiment of the present invention.

The adjacent channel leakage power ratio measuring apparatus 1 according to a second embodiment differs from the first embodiment in that the band-pass filter 22 is disposed on the upstream side of the down converters 12 and 14.

FIG. 5 shows the constitution of the adjacent channel leakage power ratio measuring apparatus 1 according to the second embodiment. Parts similar to those in the first embodiment are assigned with the same number, and description for them is not provided. The band-pass filter 22 is a hardware filter, for example. The band-pass filter 22 passes the signals to be measured. As for the center channel signal, the band-pass filter 22 passes the signal within the predetermined band centered around the center channel frequency. As for the adjacent channel signal, the band-pass filter 22 passes the signal within the predetermined band centered around the adjacent channel frequency. How to obtain the predetermined band is similar to that in the first embodiment.

The band-pass filter 22 is set so as to have an excellent characteristic of passing a signal within the predetermined band centered around the center channel frequency. However, as a result, the characteristic of passing a signal in the band centered around the adjacent channel frequency degrades. Namely, the band-pass filter 22 passes a signal outside the predetermined band centered around the adjacent channel frequency.

The down-converter 12 reduces the frequency of the adjacent channel signal having passed through the band-pass filter 22, and supplies the FFT unit 32 with the signal as a baseband signal. The down-converter 14 reduces the frequency of the center channel signal having passed through the band-pass filter 22, and supplies the second power measuring unit 40 with the signal as a baseband signal. Note that it is assumed that the IF frequency of the down converter 12 is 5 MHz, and the IF frequency of the down converter 14 is 10 MHz. Equations for reducing the frequency are similar to those in the first embodiment.

The FFT unit 32, the first power measuring unit 34, the second power measuring unit 40, and the adjacent channel leakage power ratio measuring unit 50 are similar to those in the first embodiment.

The following section describes the operation of the second embodiment.

Referring to FIG. 5 first, the adjacent channel signal and the center channel signal of the signals to be measured are independently supplied for the band-pass filter 22 of the adjacent channel leakage power ratio measuring apparatus 1. The spectrum of the adjacent channel signal is the same as that in FIG. 2(*a*), and the spectrum of the center channel signal is the same as that in FIG. 2(*b*).

The down converter 12 reduces the frequency of a signal which is a part of the adjacent channel signal having passed through the band-pass filter 22 (signal from [adjacent channel frequency−used band W] to [adjacent channel frequency+used band W]), thereby converting into the baseband signal. The down converter 14 reduces the frequency of a signal which is a part of the center channel signal having passed through the band-pass filter 22 (signal from [center channel frequency−used band W] to [center channel frequency+used band W]), thereby converting into the baseband signal.

The spectrum of the signal output from the down converter 12 is similar to that in FIG. 3(*a*), and the spectrum of the signal output from the down converter 14 is similar to that in FIG. 3(*b*).

The rest of the operation is similar to that in the first embodiment.

With the second embodiment, effects similar to those of the first embodiment are provided.

THIRD EMBODIMENT

Figure 6:
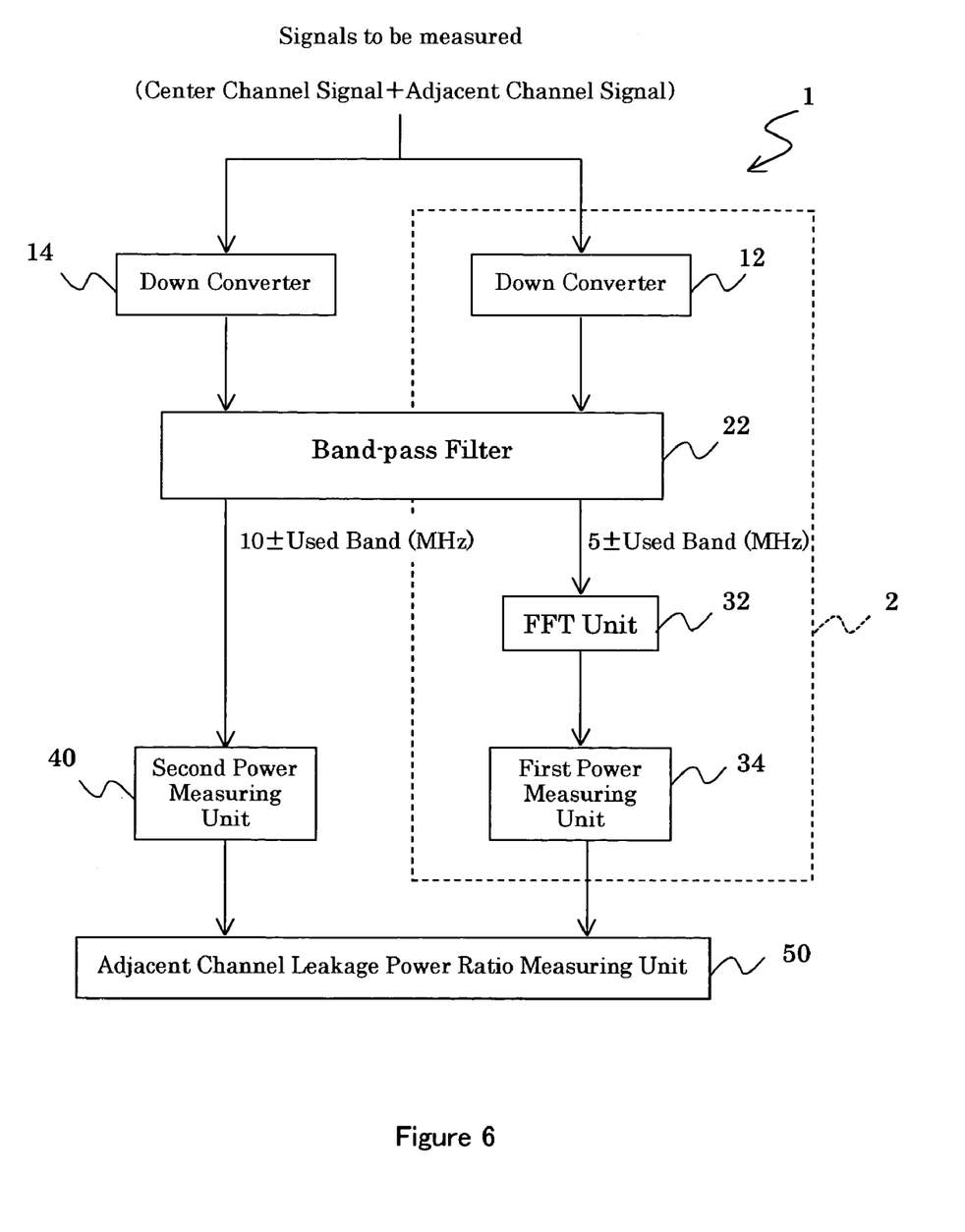
FIG. 6 is a block diagram showing the constitution of the adjacent channel leakage power ratio measuring apparatus 1 according to a third embodiment of the present invention.

The adjacent channel leakage power ratio measuring apparatus 1 according to a third embodiment differs from the first embodiment in that the center channel signal and the adjacent channel signal are combined.

FIG. 6 shows the constitution of the adjacent channel leakage power ratio measuring apparatus 1 according to the third embodiment. The signals to be measured include two types, which are the center channel signal and the adjacent channel signal, and are supplied in a combined form for the adjacent channel leakage power ratio measuring apparatus 1. The rest of the constitution and the operation are similar to those in the first embodiment.

With the third embodiment, effects similar to those of the first embodiment are also provided.

FOURTH EMBODIMENT

Figure 7:
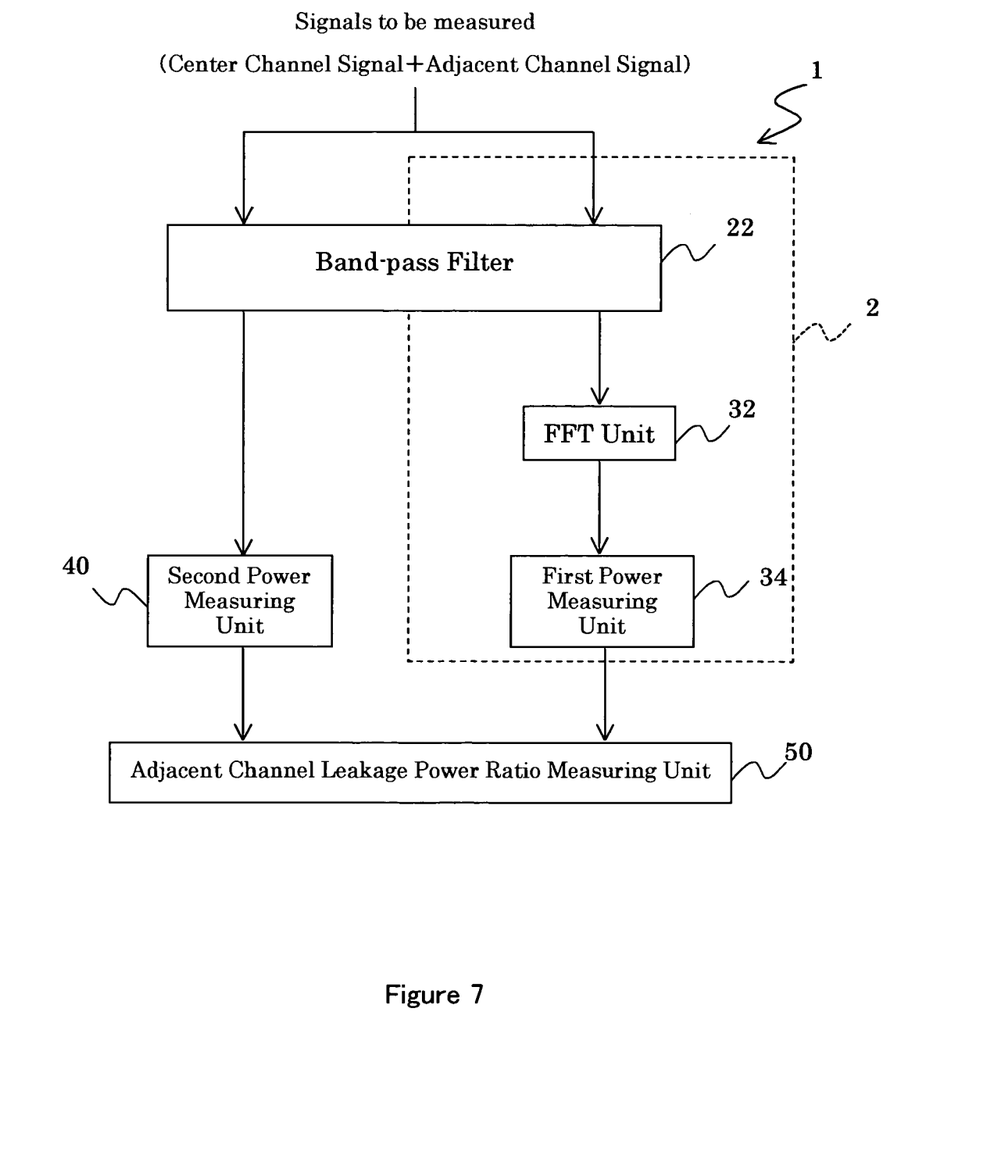
FIG. 7 is a block diagram showing the constitution of the adjacent channel leakage power ratio measuring apparatus 1 according to a fourth embodiment of the present invention.

The adjacent channel leakage power ratio measuring apparatus 1 according to a fourth embodiment differs from the third embodiment in that the down converters 12 and 14 are not provided.

FIG. 7 shows the constitution of the adjacent channel leakage power ratio measuring apparatus 1 according to the fourth embodiment. The signals to be measured include two types, which are the center channel signal and the adjacent channel signal, and are supplied in a combined form for the band-pass filter 22 of the adjacent channel leakage power ratio measuring apparatus 1. The rest of the constitution and the operation are similar to those in the first embodiment.

With the fourth embodiment, effects similar to those of the first embodiment are also provided.

The embodiments described above are realized in the following way. A computer includes a CPU, a hard disk, and a medium (such as a floppy (registered trade mark) disk, and a CD-ROM) reading apparatus, a media recording a program realizing the aforementioned individual parts (such as the FFT unit 32 and the first power measuring unit 34) is read by the media reading apparatus, and the program is installed on the hard disk. The aforementioned functions are realized in this way too.

With the present invention, it is possible to use only the signal within the predetermined band for the power measurement based on the frequency-axis-associated signal even when the band-pass filter means has an inferior characteristic, and passes a certain quantity of a signal outside the predetermined band. Thus, it is possible to receive the signals to be measured, and then, to precisely measure the powers within the predetermined bands.

The invention claimed is:

1. A channel power measuring apparatus for receiving a signal to be measured, and measuring a channel power being a power of said signal to be measured within a predetermined band, said signal to be measured including a center channel signal within a band determined based on a center channel frequency and an adjacent channel signal within a band determined based on an adjacent channel frequency separated from the center channel frequency by a predetermined frequency, wherein said predetermined band is centered around an adjacent channel frequency, the apparatus comprising:

a band-pass filter means for passing the center channel signal and the adjacent channel signal;

a frequency-axis-associated signal converting means for converting said adjacent channel signal after passing through said band-pass filter means to a frequency-axis-associated signal associated with frequency;

a first power measuring means for measuring the power of said adjacent channel signal based on a signal within the predetermined band of said frequency-axis-associated signal; and a second power measuring means for measuring the power of said center channel signal by receiving the center channel signal, which passes through said band-pass filter means, wherein said second power measuring means directly receive the center channel signal from said band-pass filter means without passing through said frequency-axis-associated signal converting means.

2. The channel power measuring apparatus according to claim 1 further comprising a frequency converting means for converting the frequency of said signal to be measured so as to supply said band-pass filter means with the converted signal.

3. The channel power measuring apparatus according to claim 1 further comprising a frequency converting means for converting the frequency of said signal to be measured after passing through said band-pass filter means so as to supply said frequency-axis-associated signal converting means with the converted signal.

4. The channel power measuring apparatus according to claim 1, wherein said center channel signal and said adjacent channel signal are input independently to said band-pass filter means.

5. An adjacent channel leakage power ratio measuring apparatus comprising:

the channel power measuring apparatus according to claim 1; and an adjacent channel leakage power ratio measuring means for measuring the adjacent channel leakage power ratio based on the ratio between the measured result of said first power measuring means and the measured result of said second power measuring means.

6. A channel power measuring method for receiving a signal to be measured, and measuring a channel power being a power of said signal to be measured within a predetermined band, said signal to be measured including a center channel signal within a band determined based on a enter channel frequency and an adjacent channel signal within a band determined based on an adjacent channel frequency separated from the center channel frequency by a predetermined frequency, wherein said predetermined band is centered around an adjacent channel frequency, the method comprising:

a band-pass filter step for passing the center channel signal and the adjacent channel signal;

a frequency-axis-associated signal converting step for converting said adjacent channel signal after performing said band-pass filter step to a frequency-axis-associated signal associated with frequency;

a first power measuring step for measuring the power of said adjacent channel signal based on a signal within the predetermined band of said frequency-axis-associated signal; and a second power measuring step for measuring the power of said center channel signal by receiving the center channel signal after performing said band-pass filter step, wherein said second power measuring step directly receive the center channel signal from said band-pass filter step without passing through said frequency-axis-associated signal converting step.

7. A computer readable medium having stored thereon a plurality of sequences, said plurality of sequences having instructions which when executed by a processor cause said processor to perform a channel power measuring process for receiving a signal to be measured, and measuring a channel power being a power of said signal to be measured within a predetermined band, said signal to be measured including a center channel signal within a band determined based on a center channel frequency and an adjacent channel signal within a band determined based on an adjacent channel frequency separated from the center channel frequency by a predetermined frequency, wherein said predetermined band is centered around an adjacent channel frequency, the process comprising:

a band-pass filter processing for passing the center channel signal and the adjacent channel signal;

a frequency-axis-associated signal converting processing for converting said adjacent channel signal after performing said band-pass filter processing to a frequency-axis-associated signal associated with frequency;

a first power measuring processing for measuring the power of said adjacent channel signal based on a signal within the predetermined band of said frequency-axis-associated signal; and a second power measuring step for measuring the power of said center channel signal by receiving the center channel signal after performing said band-pass filter step, wherein said second power measuring step directly receive the center channel signal from said band-pass filter step without passing through said frequency-axis-associated signal converting step.

8. A computer readable medium having stored thereon a plurality of sequences, said plurality of sequences having instructions which when executed by a processor cause said processor to perform a channel power measuring process for a channel power measuring apparatus for receiving a signal to be measured, and measuring a channel power being a power of said signal to be measured within a predetermined band, the apparatus including a band-pass filter means for passing a signal which is a part of said signal to be measured within said predetermined band, said signal to be measured including a center channel signal within a band determined based on a center channel frequency and an adjacent channel signal within a band determined based on an adjacent channel frequency separated from the center channel frequency by a predetermined frequency, wherein said predetermined band is centered round an adjacent channel frequency, the process comprising:
   a frequency-axis-associated signal converting processing for converting said adjacent channel signal after performing said band-pass filter processing to a frequency-axis-associated signal associated with frequency;
   a first power measuring processing for measuring the power of said adjacent channel signal based on a signal within the predetermined band of said frequency-axis-associated signal; and
   a second power measuring step for measuring the power of said center channel signal by receiving the center channel signal after performing said band-pass filter step,
   wherein said second power measuring step directly receive the center channel signal from said band-pass filter step without passing through said frequency-axis-associated signal converting step.

9. A computer software product that includes a medium readable by a processor, the medium having a program of instructions for execution by the computer to perform a channel power measuring process for receiving a signal to be measured, and measuring a channel power being a power of said signal to be measured within a predetermined band, said signal to be measured including a center channel signal within a band determined based on a center channel frequency and an adjacent channel signal within a band determined based on an adjacent channel frequency separated from the center channel frequency by a predetermined frequency, wherein said predetermined band is centered round an adjacent channel frequency, the process comprising:
   a band-pass filter processing for passing the center channel signal and the adjacent channel signal;
   a frequency-axis-associated signal converting processing for converting said adjacent channel signal after performing said band-pass filter processing to a frequency-axis-associated signal associated with frequency;
   a first power measuring processing for measuring the power of said adjacent channel signal based on a signal within the predetermined band of said frequency-axis-associated signal; and
   a second power measuring step for measuring the power of said center channel signal by receiving the center channel signal after performing said band-pass filter step,
   wherein said second power measuring step directly receive the center channel signal from said band-pass filter step without passing through said frequency-axis-associated signal converting step.

10. A computer software product that includes a medium readable by a processor, the medium having a program of instructions for execution by the computer to perform a channel power measuring process for a channel power measuring apparatus for receiving a signal to be measured, and measuring a channel power being a power of said signal to be measured within a predetermined band, the apparatus including a band-pass filter means for passing a signal which is a part of said signal to be measured within said predetermined band, said signal to be measured including a center channel signal within a band determined based on a center channel frequency and an adjacent channel signal within a band determined based on an adjacent channel frequency separated from the center channel frequency by a predetermined frequency, wherein said predetermined band is centered around an adjacent channel frequency, the process comprising:
   a frequency-axis-associated signal converting processing for converting said adjacent channel signal after performing said band-pass filter processing to a frequency-axis-associated signal associated with frequency;
   a first power measuring processing for measuring the power of said adjacent channel signal based on a signal within the predetermined band of said frequency-axis-associated signal; and
   a second power measuring step for measuring the power of said center channel signal by receiving the center channel signal after performing said band-pass filter step,
   wherein said second power measuring step directly receive the center channel signal from said band-pass filter step without passing through said frequency-axis-associated signal converting step.

11. A channel power measuring apparatus for receiving a signal to be measured, and measuring a channel power being a power of said signal to be measured within a predetermined band, said signal to be measured including a center channel signal within a band determined based on a center channel frequency and an adjacent channel signal within a band determined based on an adjacent channel frequency separated from the center channel frequency by a predetermined frequency, wherein said predetermined band is centered around an adjacent channel frequency, the apparatus comprising:
   a band-pass filter for passing the center channel signal an the adjacent channel signal;
   a frequency-axis-associated signal converter for converting said adjacent channel signal after passing through said band-pass filter to a frequency-axis-associated signal associated with frequency;
   a first power measuring device for measuring the power of said adjacent channel signal based on a signal within the predetermined band of said frequency-axis-associated signal; and
   a second power measuring device for measuring the power of said center channel signal by receiving the center channel signal, which passes through said band-pass filter,
   wherein said second power measuring device directly receives the center channel signal from said band-pass filter without passing through said frequency-axis-associated signal converter.

12. The channel power measuring apparatus according to claim 11 further comprising a frequency converter for converting the frequency of said signal to be measured so as to supply said band-pass filter with the converted signal.

13. The channel power measuring apparatus according to claim 11 further comprising a frequency converter for converting the frequency of said signal to be measured after passing through said band-pass filter so as to supply said frequency-axis-associated signal converter with the converted signal.

14. The channel power measuring apparatus according to claim 1, wherein said center channel signal and said adjacent channel signal are input independently to said band-pass filter.

15. An adjacent channel leakage power ratio measuring apparatus comprising:

the channel power measuring apparatus according to claim 11; and an adjacent channel leakage power ratio measuring device for measuring the adjacent channel leakage power ratio based on the ratio between the measured result of said first power measuring device and the measured result of said second power measuring device.

* * * * *